United States Patent [19]
Ellwood et al.

[11] Patent Number: 5,833,913
[45] Date of Patent: Nov. 10, 1998

[54] INJECTION MOLDING METHOD FORMING STRENGTHENED WELD LINE

[75] Inventors: Kevin Richard John Ellwood; Deborah Frances Mielewski, both of Ann Arbor, Mich.

[73] Assignee: Ford Global Technologies, Inc., Dearborn, Mich.

[21] Appl. No.: 998,753

[22] Filed: Dec. 29, 1997

[51] Int. Cl.⁶ .......................... B29C 45/37; B29C 45/56
[52] U.S. Cl. ............................... 264/328.7; 264/328.8; 264/328.12; 425/577
[58] Field of Search ............. 264/328.7, 328.8, 264/328.12, 69, 71, 72; 425/577

[56] References Cited

U.S. PATENT DOCUMENTS

| | | | |
|---|---|---|---|
| 3,880,978 | 4/1975 | Apostoleris et al. . | |
| 4,187,274 | 2/1980 | Arnason | 264/293 |
| 4,781,879 | 11/1988 | Oishi | 264/328.12 |
| 4,844,405 | 7/1989 | Sorensen | 425/577 |
| 4,942,010 | 7/1990 | Baker | 264/328.12 |
| 4,960,557 | 10/1990 | Sorensen . | |
| 4,994,220 | 2/1991 | Gutjahr et al. . | |
| 5,112,551 | 5/1992 | Hylak et al. | 264/328.12 |
| 5,225,136 | 7/1993 | Furugohri et al. . | |
| 5,254,304 | 10/1993 | Adachi et al. . | |
| 5,399,305 | 3/1995 | Bross et al. | 264/328.12 |
| 5,484,563 | 1/1996 | Miyazaki et al. . | |
| 5,538,413 | 7/1996 | Gardner et al. . | |
| 5,690,886 | 11/1997 | Kurihara | 264/328.12 |

FOREIGN PATENT DOCUMENTS 61-27228  2/1986  Japan .................. 264/328.12

Primary Examiner—Jill L. Heitbrink
Attorney, Agent, or Firm—Damian Porcari

[57] ABSTRACT

An injection molding process for a thermoplastic resin using a mold having disrupters in the location in which weld lines will be formed. Molten resin is injected into a mold cavity as at least two separate streams having a flow front and a flow core. The mold cavity is filled with resin from each of the streams whereby a weld line will be formed at an interfacial area where the flow fronts meet. The disrupters located perpendicular to the resin flow direction disrupt the flow fronts prior to the interfacial area. The flow fronts are thereby fragmented. This allows the flow front fragments, and the flow cores to be more homogeneously dispersed within the interfacial area thereby increasing the weld line strength and appearance.

3 Claims, 4 Drawing Sheets

INJECTION MOLDING METHOD FORMING STRENGTHENED WELD LINE

BACKGROUND OF THE INVENTION

1. Field Of The Invention

The instant invention relates to an injection molding method, an injection mold, and an injection molded article. More particularly the instant invention is concerned with an injection molding method and an injection mold which can remarkably improve the weld line strength of a molded article. The instant invention is also directed to an article having improved weld line strength as formed by the injection molding method of the instant invention.

2. Description Of The Related Art

In a conventional injection molding process, a molten resin is injected into and fills a mold cavity through a plurality of gates such that a plurality of resin streams are formed within the mold cavity. A weld line is formed at the interfacial area where the individual resin streams meet and fuse. Even if the molten resin is injected through a single gate, the resin is often separated into separate streams by a core within the cavity. A weld line is again formed when the separated resin streams meet. It is therefor extremely likely that a molded article will have at least one weld line.

The weakness of molded articles at the weld line poses serious difficulties for both design and durability. Weld lines degrade the appearance of a molded article and are identified as a streaky pattern on the surface of the article. Further, the strength at the location of a weld line is much lower than the strength inherently possessed by the resin.

All processed polymers contain additive packages which are a mixture of one or more insoluble additives which provide benefits either during the processing of the article or during the lifetime of the article itself. For instance, polypropylene is normally injection molded with the addition of one or more insoluble additives called antioxidants. Antioxidants protect the polymer from degradation during the molding process and the corresponding loss of molecular weight and properties. Other common additives are internal lubricants and plasticizers which improve processing, flexibility and stretchability of polymers. Further, it is common to mix two or more polymers together to optimize certain properties of polymers such as tensile or low temperature impact strength. If the polymers are insoluble then the minor phase will exist as droplets in the bulk matrix and the droplets will accumulate at the flow front.

It is known that certain insoluble additives segregate from the body of the molten resin and accumulate on the flow front of the resin stream during injection of the resin stream. They are normally introduced at very low concentration to the matrix and the elongational flow near the flow front concentrates the additive droplets at the flow front thereby decreasing the strength of the weld lines. The phenomenon known as fountain flow further deposits the additive onto the surface of the component during mold filling.

Even though very small quantities of additives, 0.1%–0.5% by weight, can be added to the flow core, and are initially homogeneously dispersed, they accumulate at the flow front during the mold filling process. The flow fronts then meet at the interfacial area and the additives become trapped at the weld line without the flow fronts and flow cores being homogeneously mixed. The additives are generally not miscible in the resin and do not bond well to the additives or resin from the other flow front. The relatively high concentration of additives at the weld line produces a streaky appearance that has a lower strength than the overall part.

Among the materials commonly added to the bulk resin are recycled plastic materials. These recycled materials often include a blend of plastics and additional concentrations of additives to better enable them to be used together with virgin plastic. Unfortunately, these different plastic materials are often incompatible with the bulk resin and require an increased concentration of additives. The use of recycled plastic material exacerbate the weld line problem by creating even higher concentrations of additives and incompatible plastic material at the flow front.

Various methods have been used to improve the weld line strength and appearance of molded articles. One such method is disclosed in U.S. Pat. No. 5,225,136, in which a mold cavity is provided with a resin reservoir having a retractable piston. The piston is advanced toward the mold cavity side to cause the migration of resin from the resin cavity into the mold. This reinforces the weld by forcing the resin on one side of the weld into the resin on the other side.

Another method is disclosed in U.S. Pat. No. 5,538,413, in which a reciprocating member extends along a longitudinal axis through the mold cavity. Movement of the reciprocating member implements a local displacement and mixing of an amount of molding material within the mold cavity.

These method create only a small amount mixing of the resin and additives. They result in a localized mixing of only a portion of the weld line. It is therefor difficult for the cited methods to disturb the orientation of a significant amount of resin along the entire weld line. Further, the structures of the mold is made increasingly complicated due the addition of dynamic external apparatuses. This complication increases the cost of the mold and therefor decreases the value of the advantageous effects achieved.

It is therefor desirable to create a molding process and an associated mold which inexpensively increases the weld line strength and improves the appearance of a molded article. The invention better enables the use of recycled plastics and plastics with higher concentrations of additives.

SUMMARY OF THE INVENTION

Responsive to the disadvantages of the prior art, the instant invention provides a molding process and a novel mold which inexpensively increases the weld line strength and improves the appearance of a molded article.

According to one embodiment of the instant invention, there is provided an injection molding process for a thermoplastic resin by using a mold having shallow grooves in the location in which weld lines will be formed. Molten resin is injected into a mold cavity and is separated into at least two separate streams having a flow front and a flow core. The mold cavity is filled with resin from each of the streams whereby a weld line will be formed at an interfacial area where the flow fronts meet. The shallow grooves located perpendicular to the resin flow direction disrupt the flow fronts prior to the interfacial area. The flow fronts are thereby fragmented. This then allows the flow front fragments, and the flow cores to be more homogeneously dispersed within the interfacial area.

The apparatus for thermoplastic resin molding of the present invention is distinguished by the presence of disrupters within the mold cavity. The disrupters are located at the interfacial area in which the molten resin streams meet. The disrupters comprise a grooved area perpendicular to said resin stream at the contact area. In another embodiment the disrupters are a plurality of protrusions at the interfacial area.

A further embodiment of the instant invention locates the disrupters only on the nonappearance side of the mold cavity. Placing the disrupter on the non-appearance side of the mold cavity produces a molded article that has no visual indication of the disrupters.

A still further embodiment of the instant invention uses retractable disrupters. The disrupters are extended into the flow front during the injection process before the flow front meet. The flow fronts are fragmented by the disrupters. After the flow front have been mixed, the disrupters are retracted and produce a part with little or no indications of disrupters.

Accordingly, an object of the instant invention is to provide a molding process and a mold which inexpensively increases the weld line strength of a molded article. Another object of the instant invention is to reduce the aesthetic defects that occur at the location of a weld line.

An advantage of the instant invention is the use of disrupters in a mold cavity to inexpensively fragment a resin flow front and intermix the additives back into the flow core thereby increasing the weld line strength.

These and other desired objects of the instant invention will become more apparent in the course of the following detailed description and appended claims. The invention may best be understood with reference to the accompanying drawings wherein illustrative embodiments are shown.

BRIEF DESCRIPTION OF THE DRAWINGS

FIG. 3a is a view of the mold cavity illustrated in FIG. 3 after the two flow front meet with the additives more evenly dispersed than in FIG. 2a.

DETAILED DESCRIPTION OF THE PREFERRED EMBODIMENTS

Figure 1:
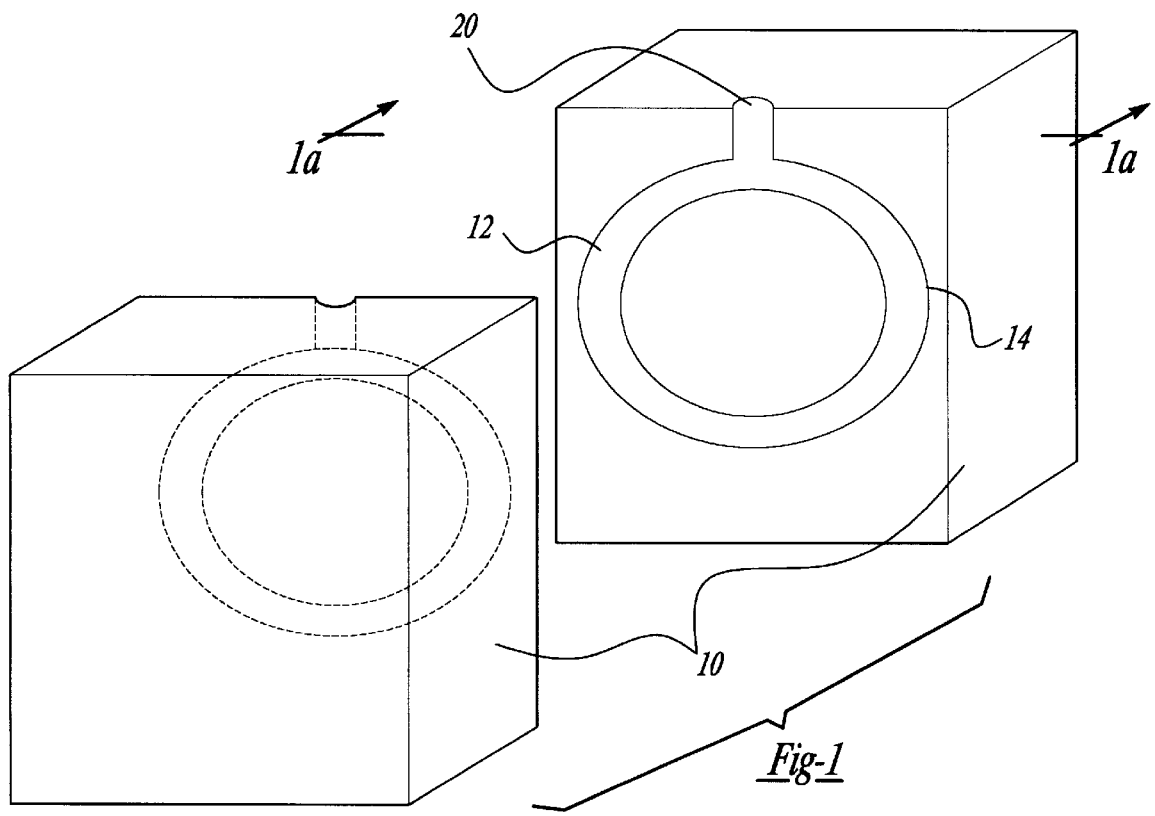
FIG. 1 is a perspective view of an injection mold and mold cavity.
Figure 1A:
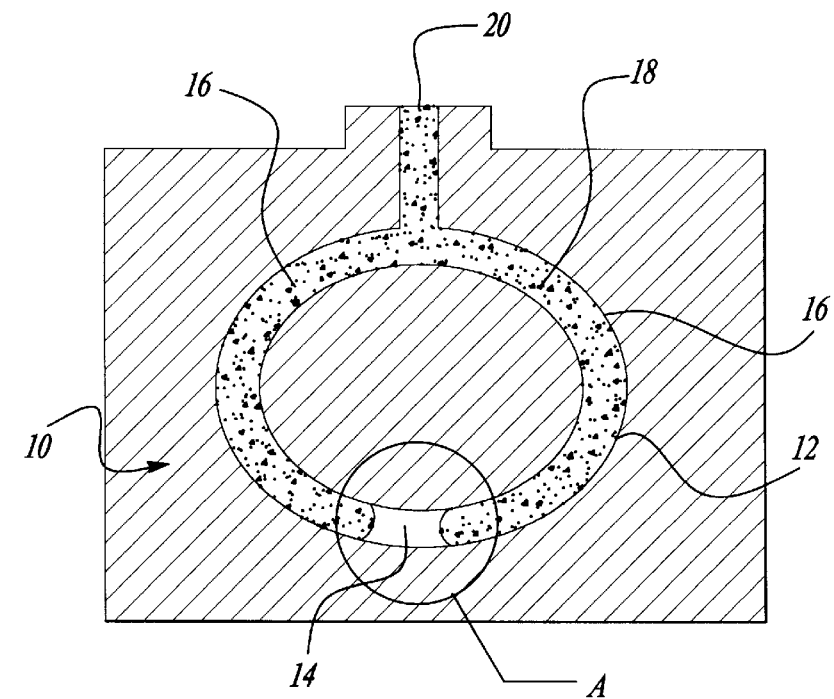
FIG. 1a is a simplified cross-sectional diagram taken through line 1a—1a of FIG. 1 showing the flow of a resin stream.

The present invention will be described through a series of drawings, which illustrate an injection molding method, mold and injection molded article. The following items are a word list of the items described in the drawings and are reproduced to aid in understanding the invention:

10 mold
12 mold cavity
14 mold surface
16 plastic material
18 additives
20 gate
22 melt flow front
24 component surface
26 insoluble liquid additive
28 flow core
30 resin stream
32 disrupters
34 pins
36, 36' weld line Referring to FIG. 1, there is shown a mold 10 having a mold cavity 12. The mold cavity 12 has a mold surface 14 to produce an article of a desired configuration. FIG. 1a is a section view through FIG. 1 showing plastic material 16, such as polypropylene for example, containing additives 18 being injected into the mold cavity 12. The plastic material 16 is first heated and then fed through one or more gates 20 to the mold cavity 12. During filling of the mold cavity 12, the plastic material 16 quenches when it hits the mold surface 14 during formation of the desired article. The additives 18 are normally insoluble or very nearly insoluble in the host resin under the temperature and pressure conditions of injection molding. The insoluble liquid additive 26 portion of the additive 18 will remain as distinct liquid droplets and become deposited on the component surface 24.

Figure 2:
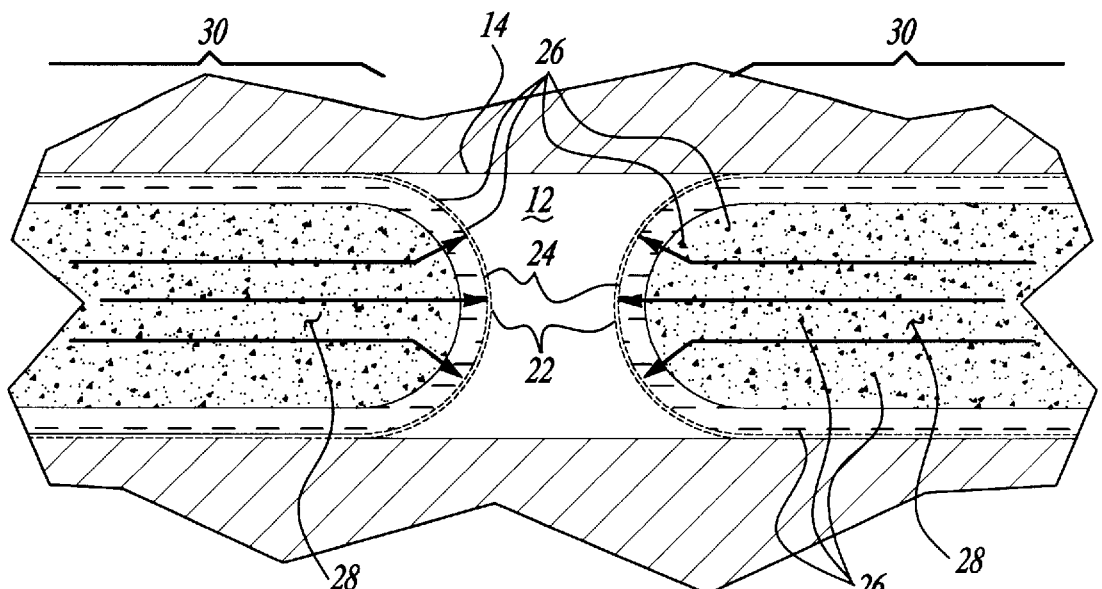
FIG. 2 is an enlarged view of the area marked A in FIG. 1 in a mold cavity not having flow disrupters.

FIG. 2 is an enlarged view of the area marked A in FIG. 1a showing the split resin stream 30 of plastic material 16 entering the mold cavity 12 wherein elongational fountain flow effect results as indicated by the arrows. The boundary between the plastic material 16 advancing from the gate 20 and the still-empty portion of the cavity 14 is the melt flow front 22. The melt flow front 22 is a stretching membrane of polymer that rolls out like a caterpillar tread onto the relatively cold mold surface 14 creating a zone or layer of surface orientation. The stretching melt flow front 22 covers the inside mold surface 14 of the mold cavity 12.

Figure 2A:
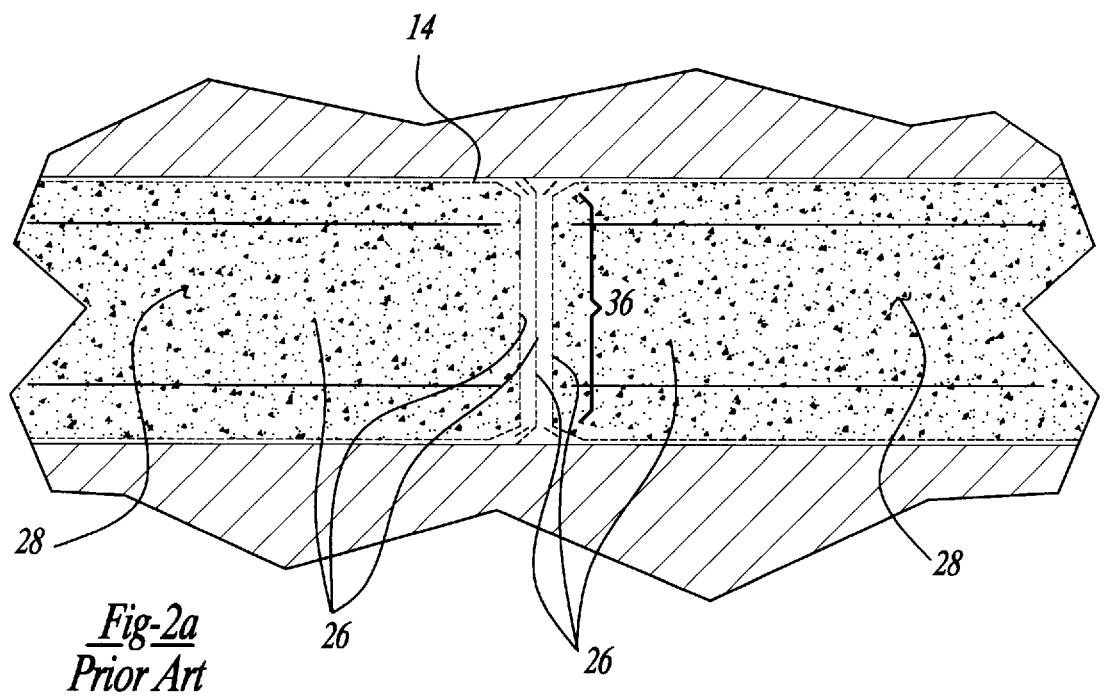
FIG. 2a is a view of the mold cavity illustrated in FIG. 2 after the two flow front meet with the additives concentrated at the weld line area.

FIG. 2a shows the results of prior art conventional injection molding processes which cause insoluble liquid additives 26 to conjugate along the flow fronts and therefor the weld lines 36. The elongational flow tends to stretch bulk fluid elements parallel to the free surface allowing the embedded insoluble additives 26 to come into intimate contact with the free surface 24. Once becoming exposed to the free surface 24, the insoluble additives 26 accumulate there forming a layer. When this layer converges upon another they form a band of insoluble material at the weld line 36. The weld line 36 is distinguished as a mechanically weak nonhomogeneous area with a concentration of insoluble additives 26.

FIG. 2a further details that the flow fronts 22, have not been disrupted prior to meeting at the interfacial area. The flow fronts converge in the interfacial area and the insoluble additive droplets 26 form the weld line 36. The flow core 28 is therefor separated across the interfacial area thereby developing a decrease in strength and visual imperfection along the weld line.

Figure 3:
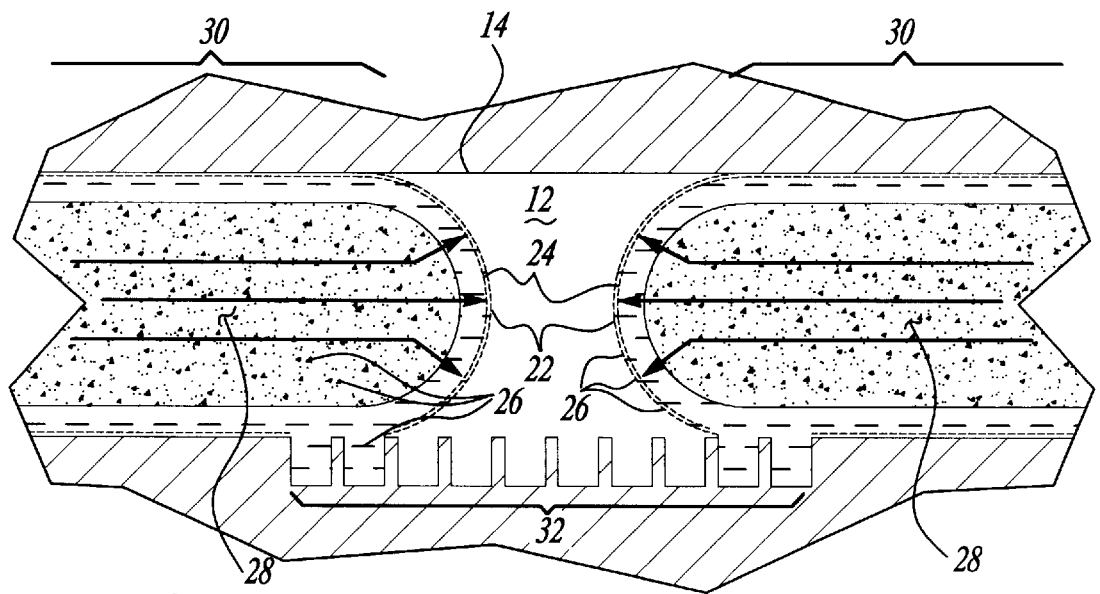
FIG. 3 is an enlarged view of the area marked A in FIG. 1a in a mold cavity having recessed flow disrupters.

FIG. 3 is an enlarged view of the area marked A in FIG. 1a showing a sectional view of a discrete interfacial area having disrupters 32 of the present invention within the mold cavity 12. The interfacial area is defined as a location in which two or more resin streams 30 meet. As the resin streams 30 approach the interfacial area they come in contact with the disrupters 32. The disrupters 32 here shown as grooves are oriented perpendicular to the flow path of the resin streams. As the resin streams 30 pass through the disrupters 32 the flow fronts 22 are fragmented. This fragmentation of the flow fronts 22 allows the insoluble additive droplets 26 contained therein to intermix with the flow core 28.

Figure 3A:
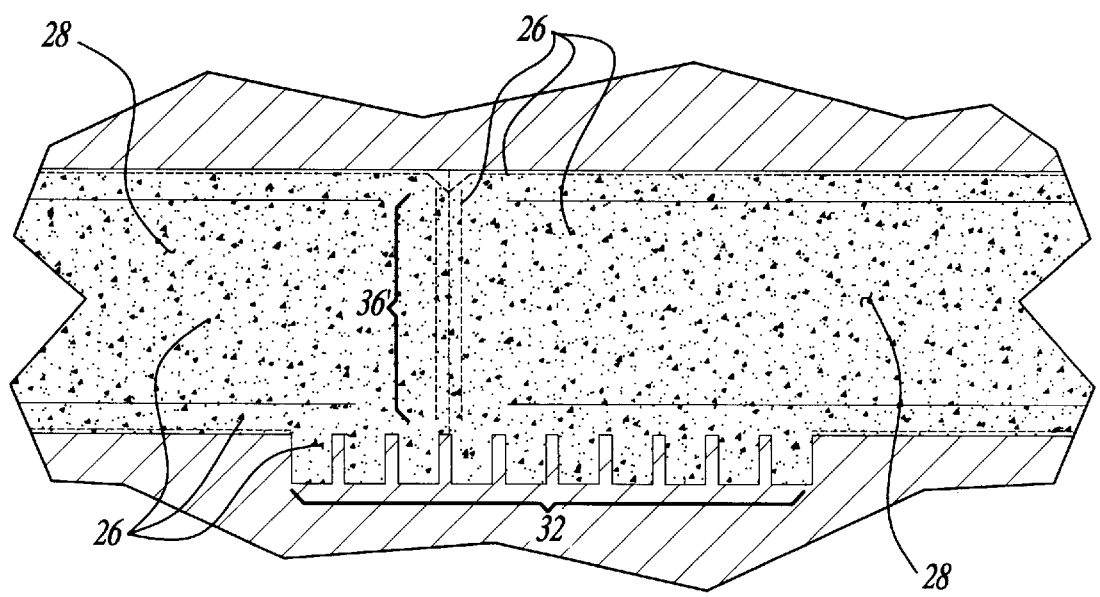

FIG. 3a further details that the flow fronts 22, have been disrupted prior to meeting at the interfacial area. The insoluble additive droplets 26 have been mixed back into the flow core 28 and greatly diminishes the formation of a weld line 36'. The flow core 28 is diffused across the interfacial area thereby developing an increase in strength and minimization of any visual imperfection along the weld line.

Figure 4:
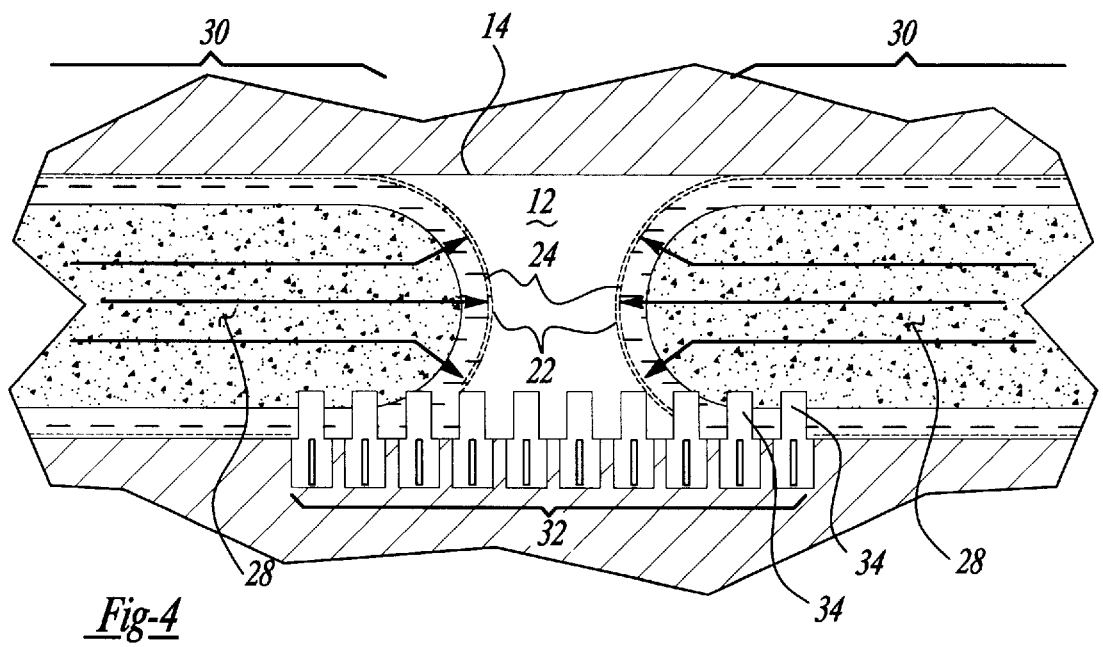
FIG. 4 is an enlarged view of the area marked A in FIG. 1a in a mold cavity having retractable flow disrupters.
Figure 4A:
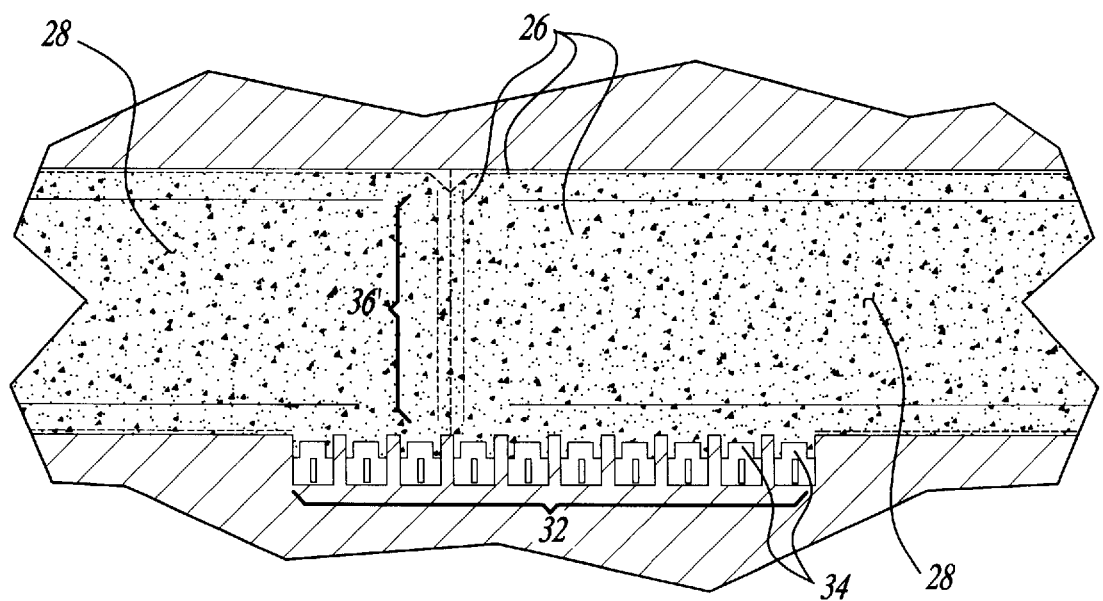
FIG. 4a is a view of the mold cavity illustrated in FIG. 4 after the two flow front meet.

As shown in FIG. 4, an alternate embodiment of the present invention provides for interfacial area disrupters consisting of protrusions into the mold cavity 12. The flow fronts 22 are fragmented by the protruding disrupters 32 in the same manner as the grooves . The protrusions can be of any shape, and are here shown simply as retractable pins 34. The use of protrusions as disrupters 32 provides the opportunity for their retraction after the fragmentation of the flow fronts 22. As shown in FIG. 4a the pins 34 retract flush with the mold surface 14, and any visual indication of the disrupters 32 are thereby eliminated from the finished molded article.

It is thus seen that the objects of this invention have been fully and effectively accomplished. It will be realized, however, that the foregoing preferred embodiments have been shown and described for the purpose of illustrating the functional and structural principles of this invention and are subject to change and modification by those skilled in the art without departing from the principles described. Therefore, this invention includes all modifications encompassed within the spirit and scope of the following claims:

What is claimed:

1. An injection molding method for a thermoplastic resin article comprising the steps of:

directing an injected molten resin into at least two separate streams having a flow front and a flow core;

filling a mold cavity with said resin from each of said streams whereby a weld line is formed in said mold cavity at an interfacial area where said flow fronts meet;

disrupting said flow fronts with a disrupter immediately prior to said flow fronts meeting at said interfacial area thereby fragmenting said first flow front and said second flow front whereby said first flow front fragments, said second flow front fragments, said first flow core and said second flow core are homogeneously dispersed in said interfacial area; and retracting said disrupter from said cavity after the fragmentation of said flow fronts.

2. The method according to claim 1, wherein said mold cavity has a first and second molding surface, forming an appearance and backing surface of said article, wherein said flow fronts are disrupted on said second surface.

3. The method according to claim 2, wherein said mold cavity has a first and second molding surface, forming an appearance and backing surface of said article, wherein said flow fronts are disrupted on said first and second surface.

* * * * *